(12) United States Patent
Galstian et al.

(10) Patent No.: US 8,184,218 B2
(45) Date of Patent: May 22, 2012

(54) OPTICALLY HIDDEN ELECTROMAGNETIC SOURCE FOR GENERATION OF SPATIALLY NON UNIFORM MAGNETIC FIELD AND TUNABLE DEVICES MADE THEREOF

(75) Inventors: Tigran Galstian, Québec (CA); Karen Asatryan, Québec (CA); Amir Tork, Quebec (CA); Vladimir Presniakov, Québec (CA); Armen Zohrabyan, Quebec (CA); Aram Babramyan, Québec (CA)

(73) Assignee: LensVector Inc., Mountain View, CA (US)

( * ) Notice: Subject to any disclaimer, the term of this patent is extended or adjusted under 35 U.S.C. 154(b) by 530 days.

(21) Appl. No.: 12/488,887

(22) Filed: Jun. 22, 2009

(65) Prior Publication Data

US 2010/0007807 A1 Jan. 14, 2010

Related U.S. Application Data (60) Provisional application No. 61/074,633, filed on Jun. 21, 2008.

(51) Int. Cl.
*G02F 1/137* (2006.01)
*G02F 1/135* (2006.01)
*G02F 1/13* (2006.01)

(52) U.S. Cl. ........... 349/23; 349/24; 349/25; 349/200

(58) Field of Classification Search .......... 349/23, 349/24, 25, 200
See application file for complete search history.

(56) References Cited

U.S. PATENT DOCUMENTS

| 4,214,819 | A | * | 7/1980 | Pohl et al. ............... 349/23 |
| 4,768,862 | A | * | 9/1988 | McAdams ............... 349/23 |
| 7,859,640 | B2 | * | 12/2010 | Galstian et al. ........... 349/200 |
| 8,028,473 | B2 | * | 10/2011 | Galstian et al. ............ 49/57 |
| 2007/0229754 | A1 | | 10/2007 | Galstian et al. |

OTHER PUBLICATIONS

Sato, "Applications of Liquid Crystals to Variable-Focusing Lenses," Optical Review, vol. 6, No. 6 (1999) 471-485.
B. Wang, M. Ye, S. Sato,"Lens of electrically controllable focal length made by a glass lens and liquid-crystal layers," Applied Optics, V.43, No. 17, pp. 3420-3425, 2004.
A. F Naumov, M. Yu. Loktev, I. R. Guralnik, G. Vdovin, "Liquid-crystal adaptive lenses with modal control," Optics Letters, V.23, No. 13, pp. 992-994, 1998.
V.V. Presnyakov, K.E. Asatryan, and T. Galstian, A. Tork, "Tunable polymerstabilized liquid crystal microlens", Optics Express, vol. 10, No. 17, pp. 865-870, 2002.
O. Pishnyak, S. Sato, O. Lavrentovich, "Electrically tunable lens based on a dual-frequency nematic liquid crystal," Applied Optics, V.45, No. 19, pp. 4576-4582, 2006.

* cited by examiner

*Primary Examiner* — Mike Qi
(74) *Attorney, Agent, or Firm* — Anglehart et al.

(57) ABSTRACT

An electromagnetic source has an electrode structure coupled to a substrate. The electrode structure has interspaced electrodes, at least one of which is spiral-shaped. At least one electrical contact interconnects the electrodes of the electrode structure. The electrode structure is responsive to an applied electrical current to generate a spatially non-uniform magnetic field. This field can act on a LC layer such that optical properties of the layer are controllable.

15 Claims, 14 Drawing Sheets

OPTICALLY HIDDEN ELECTROMAGNETIC SOURCE FOR GENERATION OF SPATIALLY NON UNIFORM MAGNETIC FIELD AND TUNABLE DEVICES MADE THEREOF

TECHNICAL FIELD

The present invention relates to the fabrication and the use of optically hidden electromagnetic sources in devices applying electric and/or magnetic field sensitive materials, such as liquid crystal displays (LCD) and other light modulators.

BACKGROUND

Liquid crystals (LC) are the materials of choice in many electro-optic applications and their use in building electrically tunable LC lenses (TLCLs) has been studied for decades [see S. Sato, "*Applications of Liquid Crystals to Variable-Focusing Lenses*," Optical Review, Vol.6, No.6 (1999) 471-485]. Since the fabrication of flat substrates (coated by flat conductive and LC-alignment layers) is the most cost-effective way to manufacture LC cells, the main effort of the research and engineering community has been devoted to different ways of obtaining TLCL operation by using flat elements. Non-uniform LC gap and hole patterned electrodes, embedded glass lens [B. Wang, M Ye, S. Sato, "*Lens of electrically controllable focal length made by a glass lens and liquid-crystal layers,*" Applied Optics, V.43, No. 17, pp. 3420-3425, 2004], modal control [A. F. Naumov, M. Yu. Loktev, I. R. Guralnik, G. Vdovin, "*Liquid-crystal adaptive lenses with modal control,*" Optics Letters, V23, No. 13, pp. 992-994, 1998], polymer stabilized [V. V. Presnyakov, K. E. Asatryan, and T Galstian, A. Tork, *Tunable polymer-stabilized liquid crystal microlens, Optics Express*, Vol. 10, No. 17, pp. 865-870, 2002] and dielectric hidden layer [T. Galstian, V. Presniakov, K. Asatryan, "*Method and Apparatus for spatially modulated electric field generation and electro-optical tuning using liquid crystals,*" USA Patent Application 20070229754, 3 Mar. 2006] are some of the approaches that have been studied and documented to date. Each of these approaches has its advantages and drawbacks; however, the industry is presently imposing severe criteria of choice which makes many of them useless for many consumer devices, such as cell phones. Among other key requirements, the speed of the device and its reliability must be emphasized.

Except for some specific cases, the influence of magnetic field on materials is usually smaller than the influence of electric field. Also, the well known methods of magnetic field generation are mainly based on the use of optically non transparent materials and/or electromagnetic coils. That is why many optical modulators are applying electric fields as the excitation means, rather than magnetic fields. This is also the case for standard LC cells and LCDs too.

It is however well known that the magnetic field may be a tool to control the orientation of the director (average orientation of long molecular axes) of LC materials, via the so called Fredericksz effect. Accordingly, there have been some attempts to use the magnetic field in LC modulators. One example of such use is for building a polarization rotator [R. L. McAdams, "*Liquid crystal polarization reorientation cell having magnetic field-applying coils,*" U.S. Pat. No. 4,768, 862, Sep. 6, 1988] using a "free-space" magnetic source, which is not optically transparent (and thus is made in a way to be out of optical path). Another interesting example is disclosed in U.S. Pat. No. 4,214,819 [L. Pohl, R. Eidenschink, J. Krause, G. Weber, "*Electro-optical modulator,*", Jul. 29, 1980], whereby the response time of liquid crystal displays (LCDs) is accelerated by using a combination of electric and magnetic fields. More specifically, optically transparent magnetic field sources are embedded in the LC cell to accelerate the response time of LCDs.

SUMMARY

The present invention provides a novel method of fabrication of an optically transparent electromagnetic source that can generate a spatially non uniform excitation field of desired form, and the use of this electromagnetic source to create a tunable liquid crystal lens, as well as modules and devices made thereof.

BRIEF DESCRIPTION OF THE DRAWINGS

The invention will be better understood by way of the following detailed description of embodiments of the invention with reference to the appended drawings, in which:

FIGS. 5b, 5c, 6a, 6b and 7 are schematic representations of variant magnetically tunable liquid crystal lenses, according to non-limiting examples of implementation of the present invention.

DETAILED DESCRIPTION

Figure 1A:
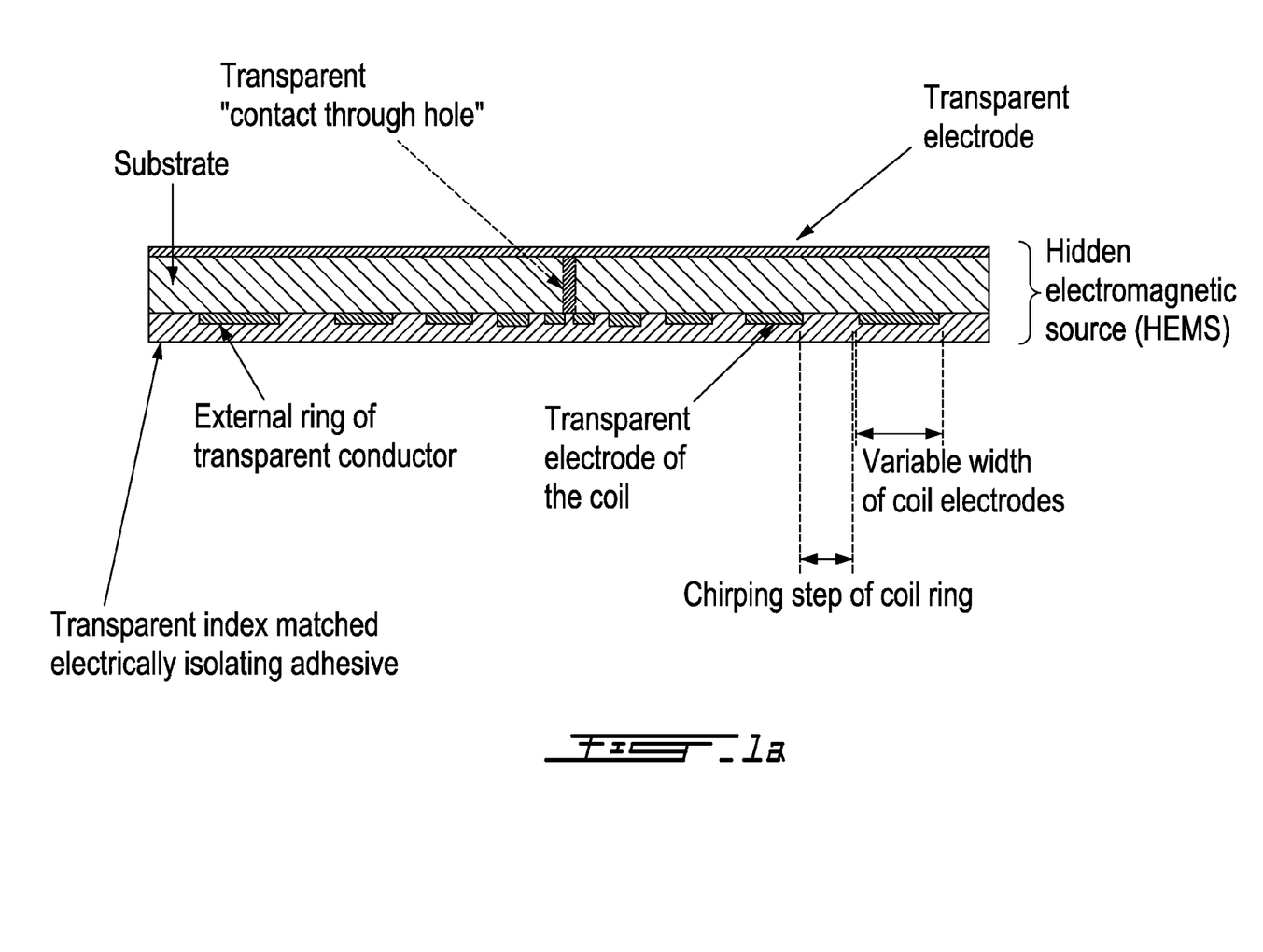
FIGS. 1a and 1b are schematic representations of the fabrication of an optically hidden electromagnetic source, according to a non-limiting example of implementation of the present invention.
Figure 1B:
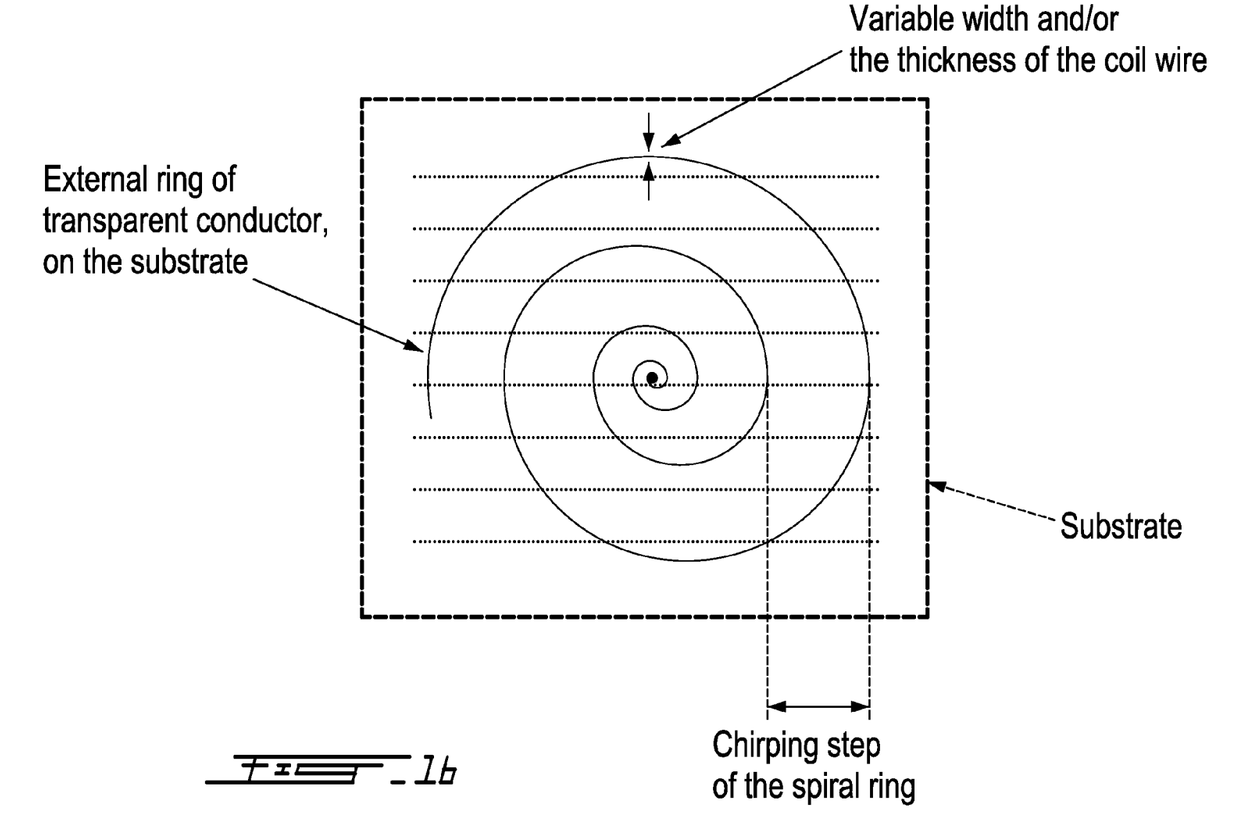

FIGS. 1a and 1b schematically illustrate the fabrication of an optically transparent ("hidden") electromagnetic source of spatially non uniform magnetic field, according to a non-limiting example of implementation of the present invention. This method of fabrication uses the deposition of two layers of optically transparent electrodes on the opposite sides of a substrate. One of the surfaces of that substrate is then processed by techniques well known in the art (i.e. laser ablation, etching, etc.) to remove part of the transparent electrode and to create a "spiralling" conductive structure, schematically shown in FIG. 1b. The external ring wire of this conductive structure may be used for one of the electrical connections supplying the current that would generate the required magnetic field. The second electrical contact may be created by different possible methods. One such possible method is shown in FIG. 1a, where a hole is drilled through the substrate and a "through-hole" electrical connection of the spiral structure is made to the uniform (or spiral shaped) electrode of the opposite side.

The transparent electrodes (particularly those having spiral form) may be covered with an optically transparent and electrically non conductive material, for isolating the electrodes and optically hiding them. Additional index matching layers may be coated also to reduce optical losses due to the index mismatch of those electrical layers and the supporting substrate. Electrical contact creation here may be rather easy to do.

Figure 1C:
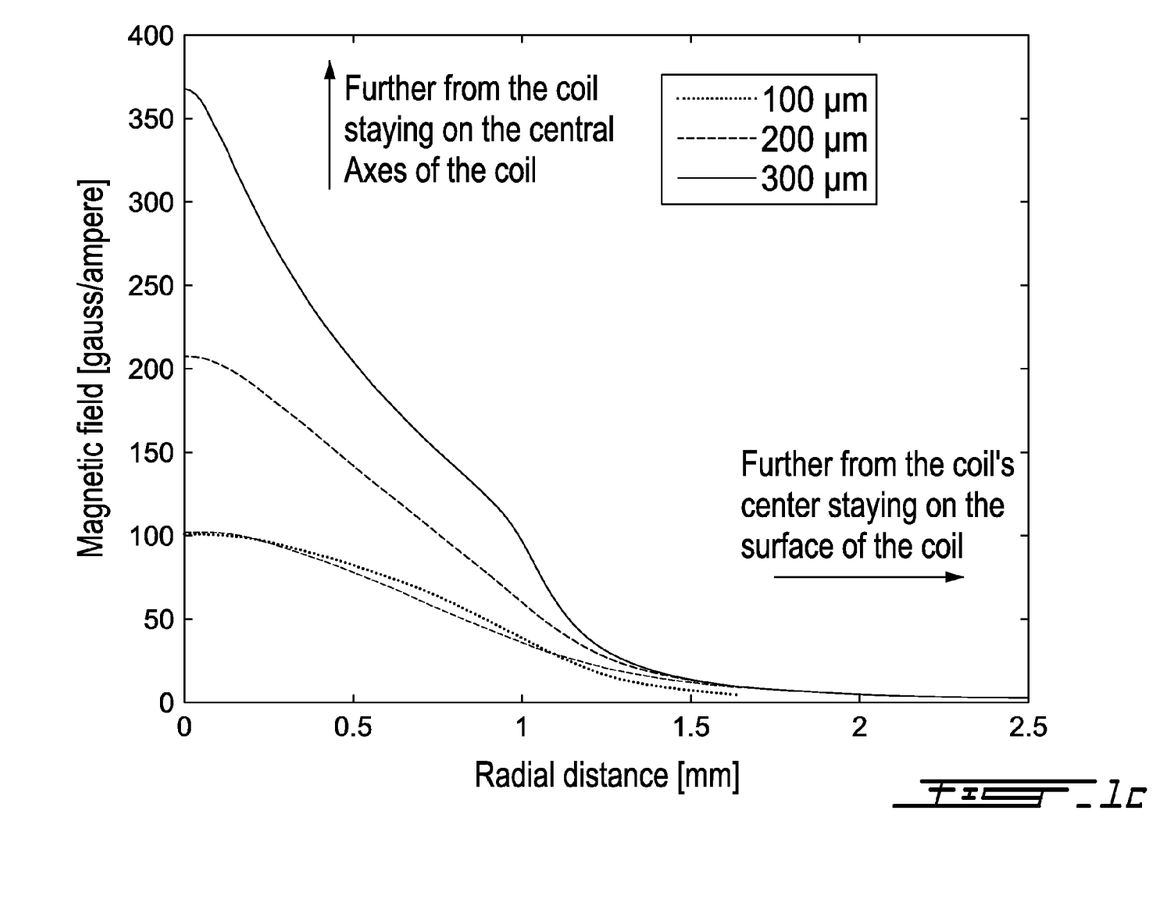
FIG. 1c illustrates simulation results for the profile of the magnetic field generated by the electromagnetic source shown in FIGS. 1a and 1b.

By applying specific spiral parameters (e.g. number of rings and their diameters, conductive layer width and thickness, etc.) and appropriate electrical current characteristics to the electromagnetic source, a magnetic field can be generated that is, for example, of approximately parabolic shape. If this hidden electromagnetic source (HEMS) was built into a liquid crystal (LC) cell, the parabolic-shaped magnetic field would act on the LC layer to generate a corresponding profile of orientation of the LC's director and thus a lens-like refractive index distribution in space. The profile of the magnetic field being defined by the geometrical factors of spirals, the strength of the field can be controlled by the electrical current and make this lens-like refractive index distribution to be dynamically variable. An example of properties generated by such a magnetic field is presented in FIG. 1c.

It should be noted that many variant fabrications of an HEMS are possible and are included in the scope of the present invention, as will be discussed below.

Figure 1D:
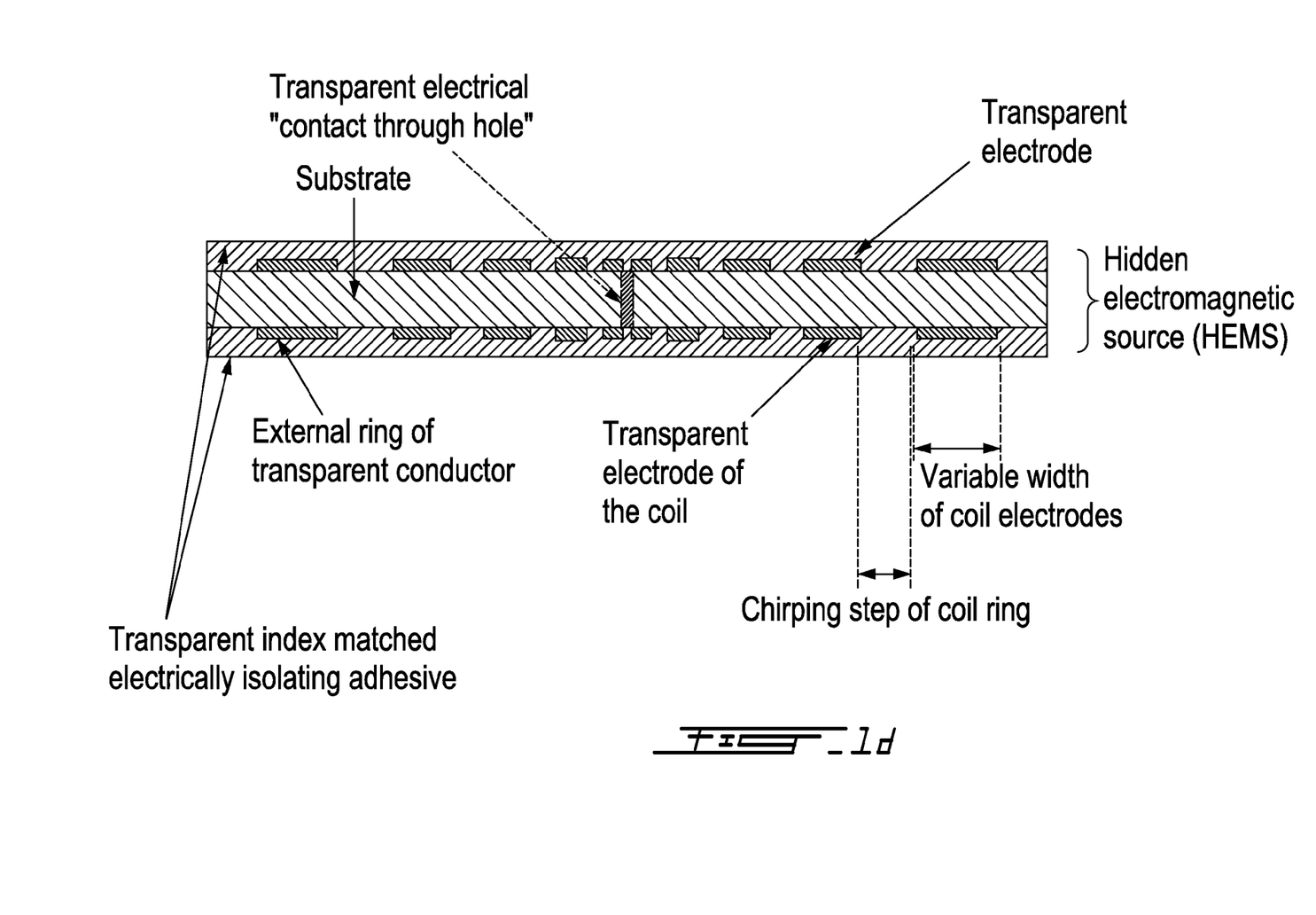
FIG. 1d is a schematic representation of a variant fabrication of an optically hidden electromagnetic source, according to a non-limiting example of implementation of the present invention.

FIG. 1d is a schematic representation of a variant fabrication of a HEMS, including a slight modification to the fabrication shown in FIG. 1a. More specifically, in this variant, both surfaces of the substrate have been processed by the appropriate techniques to remove part of the transparent electrode, thus creating a "spiralling" conductive structure on each surface.

Figure 2:
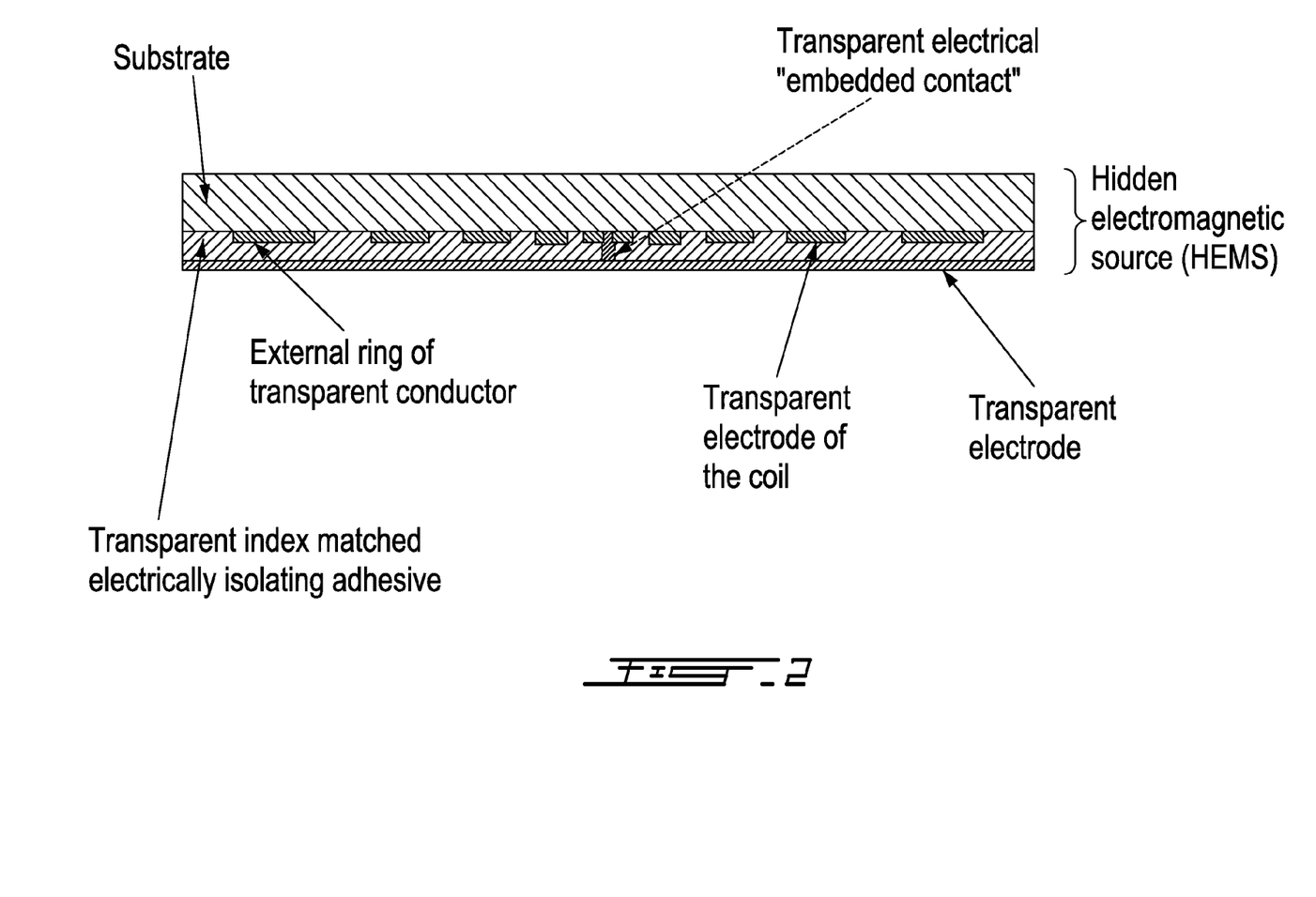
FIGS. 2, 3a and 3b are schematic representations of variant fabrications of an optically hidden electromagnetic source, according to non-limiting examples of implementation of the present invention.

FIG. 2 schematically illustrates another variant fabrication of a HEMS, according to a non-limiting example of implementation of the present invention. In this case, the supporting substrate is not drilled and two electrode layers (at least one of which is characterized by the spiral form) of the HEMS may be fabricated in a consecutive (e.g., lithographic) way. Accordingly, the electrode layers are much closer together, which reduces the size (and any possible optical impact) of the central contact. Although the example of FIG. 2 shows one electrode layer being uniform and one being in spiral form, both layers could be in spiral form. In this example, the second electrical contact (central contact) extends between the electrodes through a layer of transparent, index matched electrically isolating adhesive (i.e. it is embedded in the layer of electrically isolating adhesive). Optionally, this contact is made by using optically transparent, index-matched electrically conductive material, thus minimizing its impact on the optical properties of the whole structure. Under this variant fabrication, the electrical contact creation may require additional spatial patterning (e.g., towards the well separated directions) to avoid the electrical short and yield degradation during its fabrication.

Figure 3A:
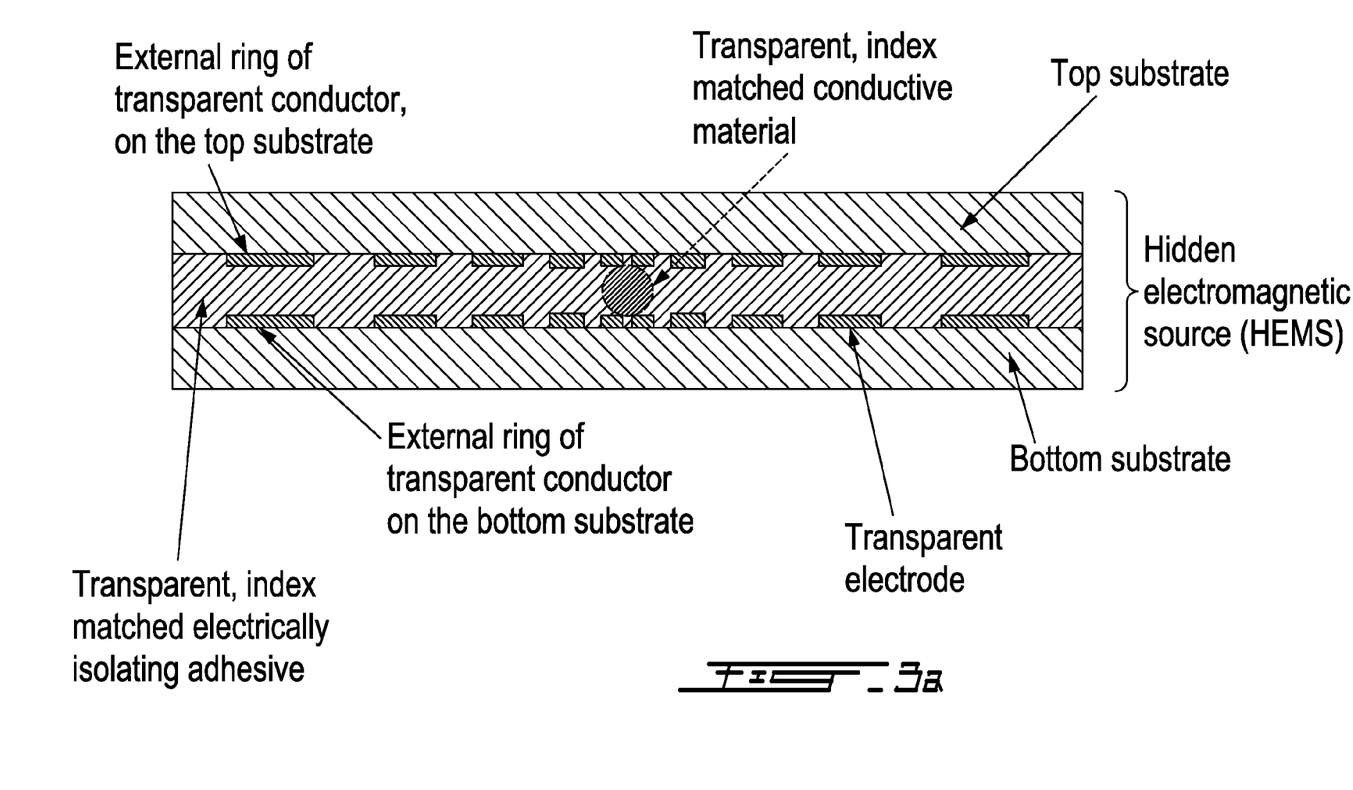
Figure 3B:
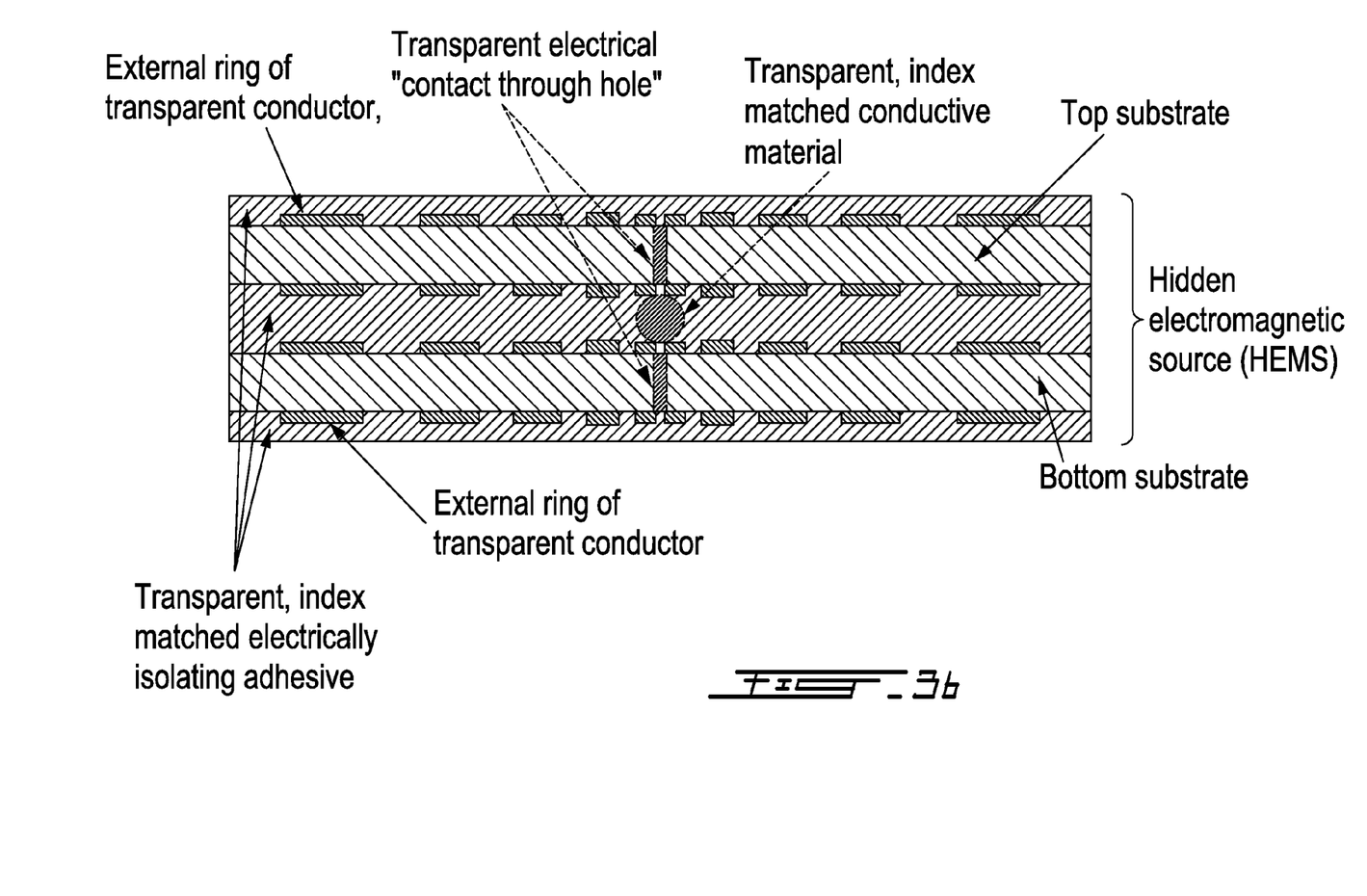

In other variant fabrications, the HEMS is created by using two separate substrates facing one another, each substrate bearing at least one of the spiral-shaped transparent electrode structures, as shown in the examples of FIGS. 3a and 3b. In the case of FIG. 3a, the same index-matched layer of electrically isolating adhesive is used to optically hide both spiral-shaped electrode structures. In these examples, both the central and external electrical contacts may be implemented as described above.

Figure 4:
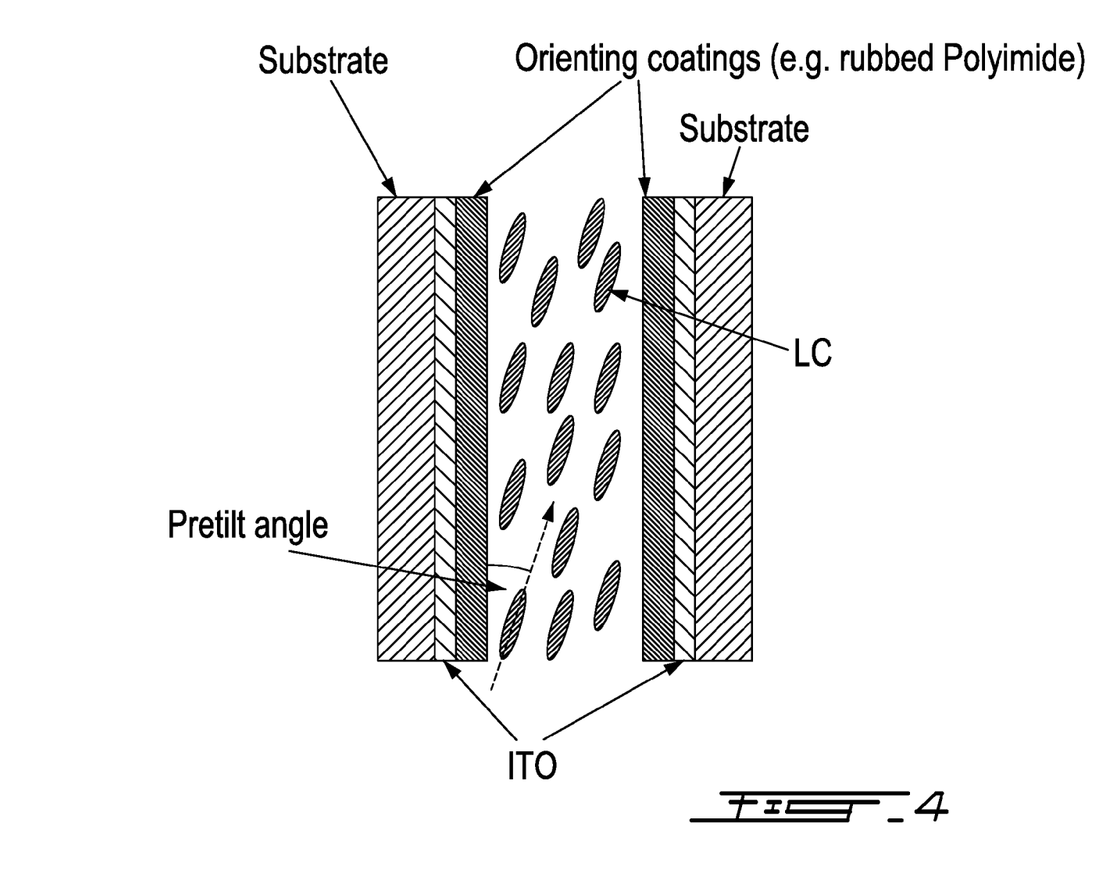
FIG. 4 is a schematic representation of a prior art liquid crystal cell configuration.

FIG. 4 schematically illustrates a prior art LC cell configuration. Conventional LC cells are fabricated by sandwiching the LC layer between two substrates, each of them bearing a uniform (in the zone of the "working pixel") and optically transparent electrode (typically Indium Tin Oxide (ITO)) coated by a thin layer of aligning material (usually polymer, e.g., polyimide) that is rubbed in a preferential direction to force the LC director in that direction. The rubbing directions and the assembly of the cell are made to obtain a specific "pretilt" of the director with respect to the cell substrates, or rather with respect to the electric field that is generated by the transparent ITO electrodes coated on the substrates.

Specific to the present invention, the juxtaposition of the above-described HEMSs (of any fabrication) with LC cells allows for the creation of different tunable liquid crystal cells (TLCLs), depending upon the required parameters.

Figure 5A:
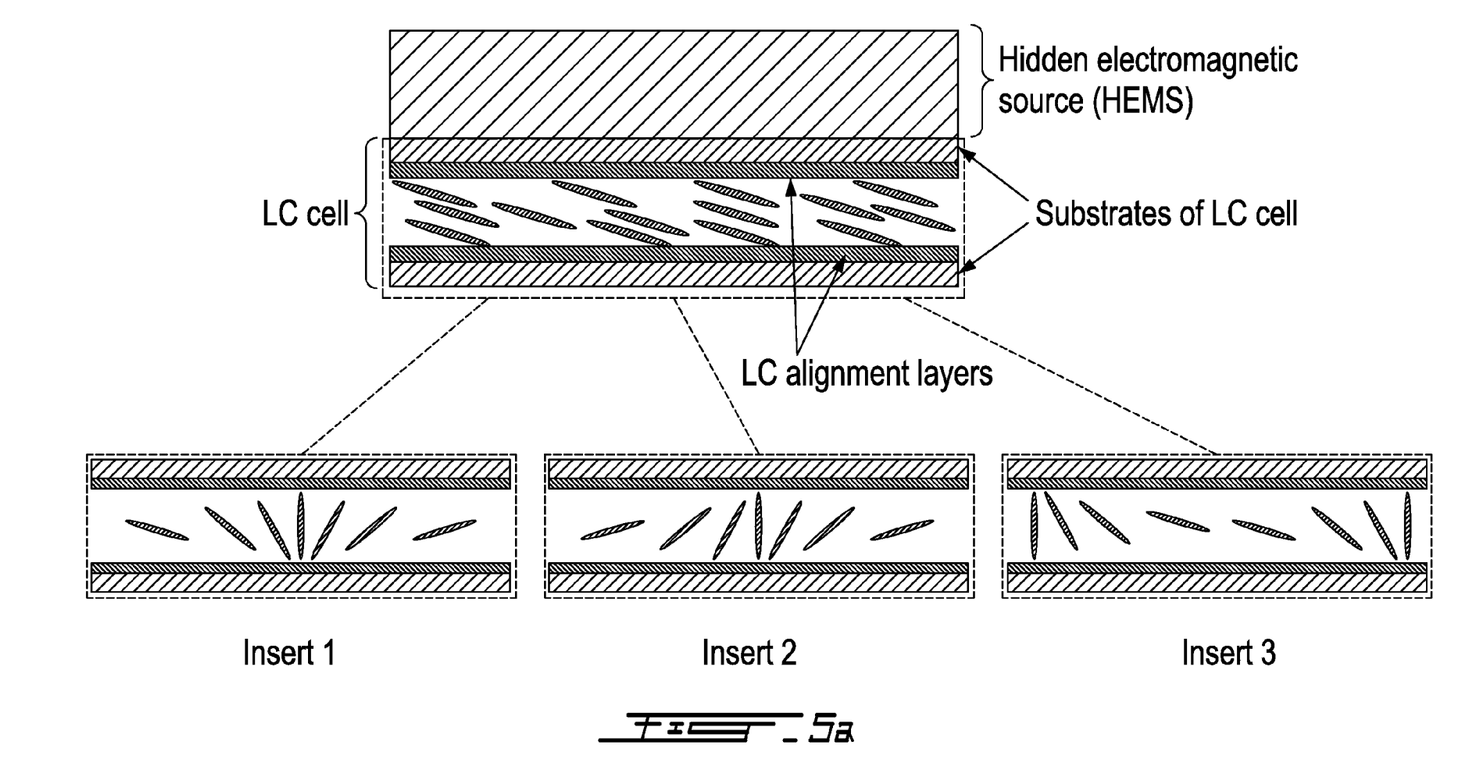
FIG. 5a is a schematic representation of a magnetically tunable liquid crystal lens, according to a non-limiting example of implementation of the present invention.

FIG. 5a schematically represents a magnetically tunable liquid crystal lens, according to a non-limiting example of implementation of the present invention. As shown in FIG. 5a, the specific geometry of the TLCL is one in which a HEMS (of any of the above-described fabrications/configurations) is placed near the LC cell without using any additional electrode. The application of electric current to the HEMS will generate a spatially non-uniform magnetic field. The particular parameters of the HEMS (e.g., small diameters of the spiral), as well as its close positioning to the LC cell, will generate enough magnetic field to reorient the LC director. However, the magnetic field being strong in the central area and much weaker on the peripheries of a desired (circularly symmetric) area, the LC director will be reoriented in the central part and will remain non-oriented in the periphery.

In a particular case of initial planar alignment of a LC having positive diamagnetic anisotropy, such a reorientation may create a negative tunable lens, which changes its optical power from 0 to a negative value, e.g., below −10 Diopters (see Inset 1 or Inset 2 of FIG. 5a). In another possible case of initial vertical alignment of a LC having negative diamagnetic anisotropy, such a reorientation may create a positive tunable lens, which changes its optical power from 0 to, e.g., >+10 Diopters (see Inset 3 of FIG. 5a). The relaxation of such a structure will be defined by the surface anchoring conditions, unless the change of the frequency of magnetic field could "repulse" the LC director if the diamagnetic anisotropy at the new frequency is of opposite sign (compared to the excitation case). We refer here to the so called dual-frequency liquid crystal control [see Pishnyak, S. Sato, O. Lavrentovich, *Electrically tunable lens based on a dual-frequency nematic liquid crystal," Applied Optics, V.* 45, No. 19, pp. 4576-4582, 2006], applied to a magnetic field rather than to an electric field. This consideration does not limit the benefits of the above described magnetically TLCL, since it has better optical transparency (no additional control electrodes), is simple and cost effective.

Figure 5B:
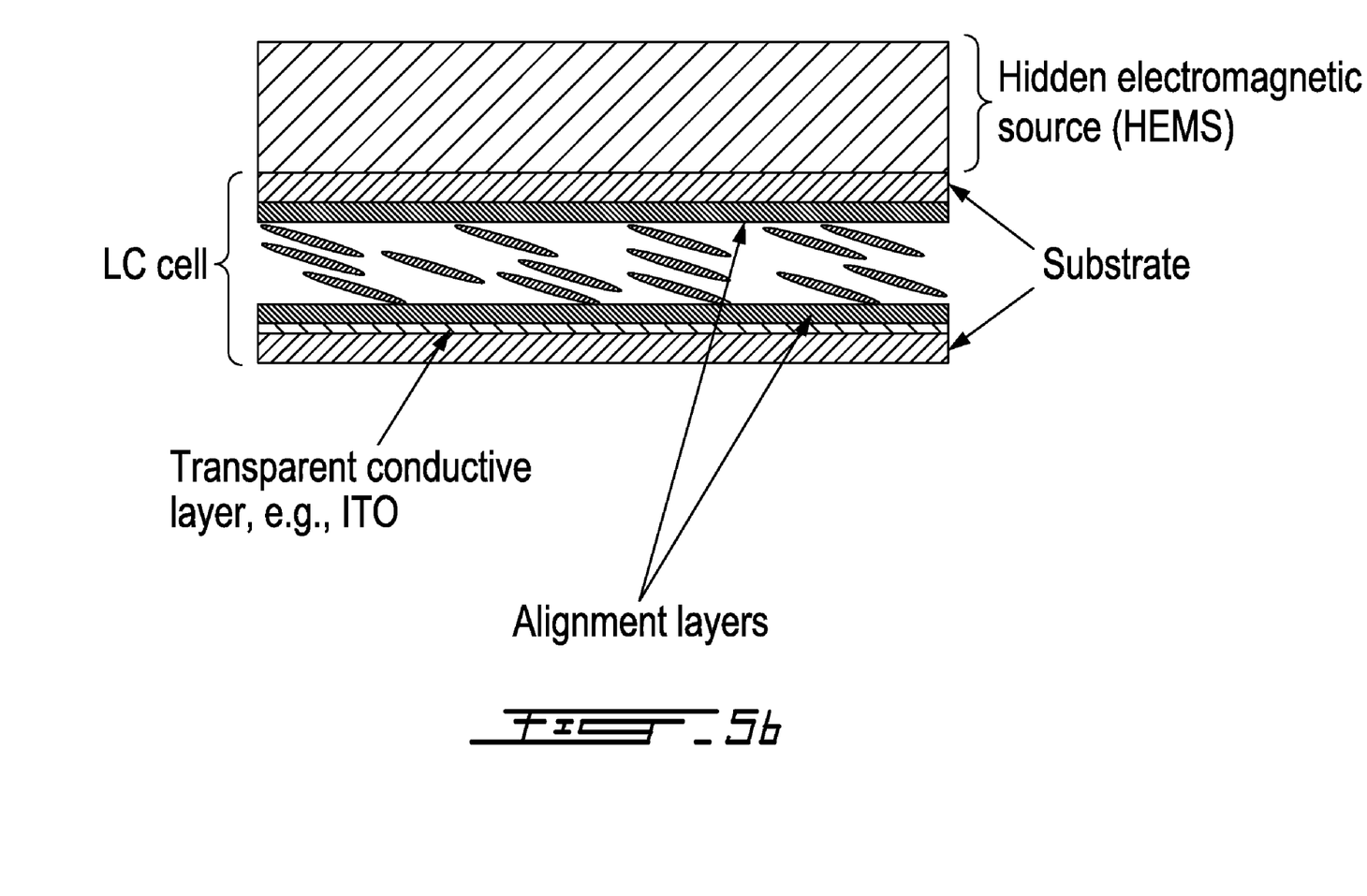

The drawback of free relaxation may be removed by the use of one or two additional electrodes. Thus, FIG. 5b schematically illustrates a variant magnetically TLCL, including the addition of a transparent electrode that may be used to apply a voltage between itself and the electrodes of the HEMS to generate additional electric field to force the LC director to recover its initial or desired intermediate orientations. The specificity here would be the fast transitions (if the electric and magnetic anisotropies of the LC are of opposed sine, e.g., one is negative and one is positive), but also a possible hysteresis (if both fields are applied in the same time and with specific forces). If the dielectric and magnetic anisotropies are of the same sign (e.g., both are positive), then the combined action of electric and magnetic fields may reinforce the reorientation and allow the control of the reorientation profile.

Note that the conductive layers of the spiral of the HEMS may be made with relatively high electrical resistance, e. g., by the choice of their width and thickness. In this case, in addition to generating the magnetic field, the spiral electrode structure would act to decrease the electrical voltage value between its surface (going from external to the central areas) and the uniform transparent electrode that is used to apply the electric field. This would make the analogy of the so called "modal control" TLCL, where a similar phenomenon of voltage spatial variation is obtained by the use of relatively rare and non efficient materials with very high electrical resistance.

Figure 5C:
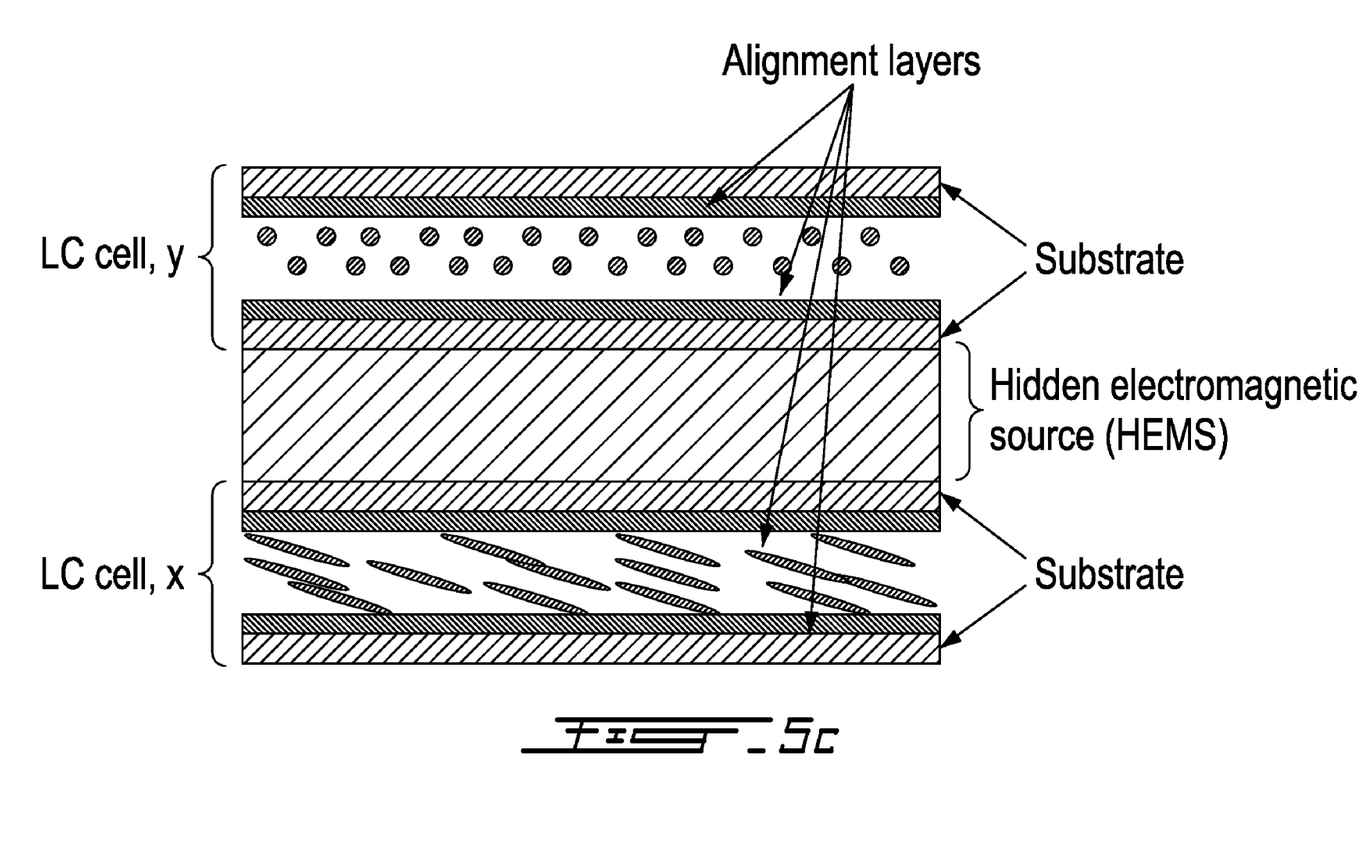
Figure 6A:
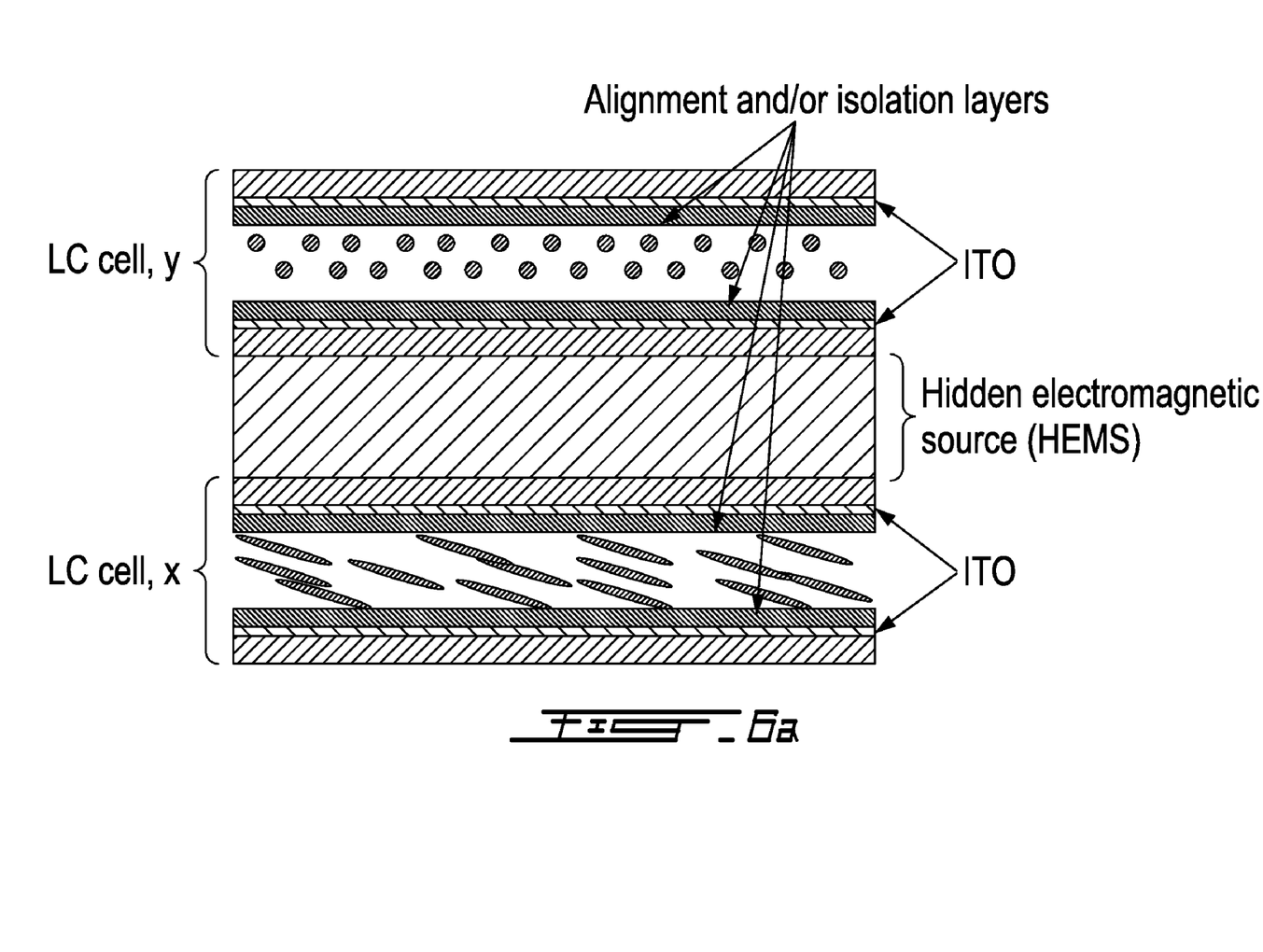
Figure 6B:
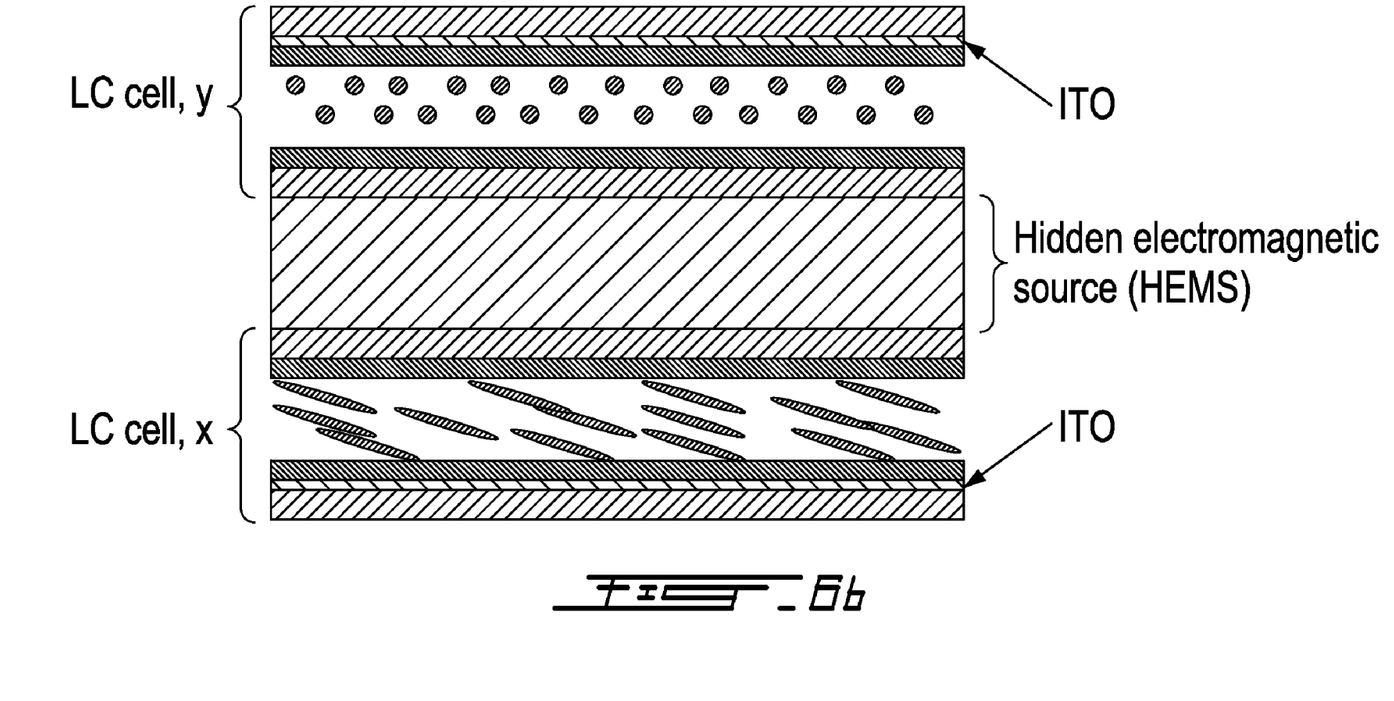
Figure 6C:
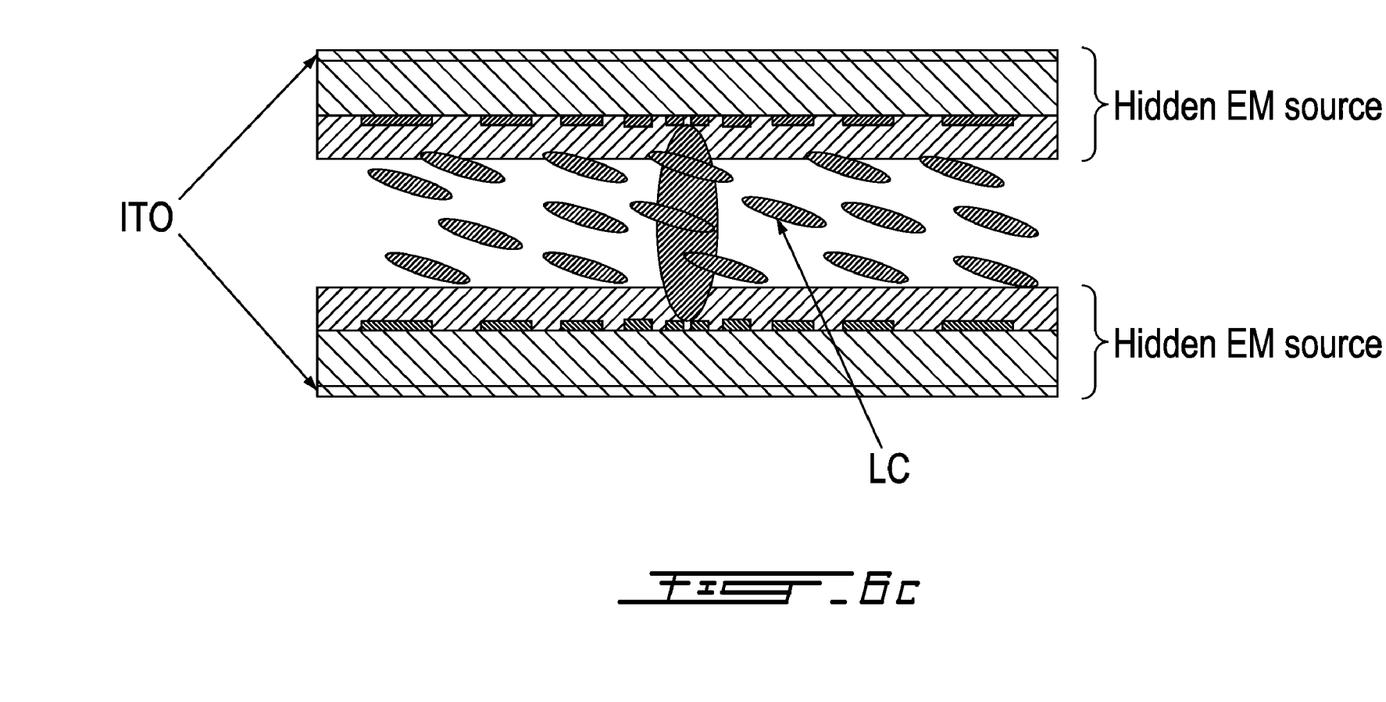

If the TLCL devices are made to be used with polarized light (lasers, polarization maintaining endoscopes, DVD readers, etc.) then the described devices may be good tools for tunable focusing and zoom applications. However, if the handling of two polarizations of light is required (such as when working with natural light, e.g., in cell phones, etc.), then a cross-oriented layer of LC must be added to build a polarization independent TLCL. A possible implementation of such a magnetically TLCL is schematically illustrated in FIG. 5c. Two LC layers are used here with directors pointing in the perpendicular directions, both being in the plane of LC cell substrates. The LC layers are positioned on either side of the HEMS. The magnetic field generated by the HEMS will thus reorient both LC directors in the same manner. Variant examples of implementation of a magnetically TLCL with cross-oriented LC layers are shown in FIGS. 6a and 6b, in which additional electrodes have been added to the lens configuration.

FIG. 7 schematically illustrates yet another variant magnetically TLCL, according to an example of implementation of the present invention. As seen in FIG. 7, the HEMS is embedded within the LC layer, between the top and bottom substrates. In the case of each of the top and bottom substrates, the surface that is adjacent to the LC layer has been processed by the appropriate techniques to create a "spiralling" conductive structure. A transparent, index matched conductive material extending between the spiral electrodes, through the LC layer, acts as the "electrical contact" between the electrodes.

It is important to note that the above-described embodiments of the present invention have been presented for illustration purposes but that additional variants and modification are possible and should not be excluded from the scope of the present invention.

It should also be appreciated by the reader that various optical devices can be developed using the device described above.

What is claimed is:

1. An electromagnetic source comprising:
    a substrate;
    an electrode structure coupled to said substrate, said electrode structure including interspaced electrodes, at least one of which is spiral-shaped; and
    at least one electrical contact interconnecting the electrodes of said electrode structure, whereby said electrode structure is responsive to an applied electrical current to generate a spatially non-uniform magnetic field.

2. An electromagnetic source as defined in claim 1, wherein said magnetic field is dynamically variable on a basis of said electrical current.

3. An electromagnetic source as defined in claim 1, wherein said electromagnetic source is optically transparent.

4. An electromagnetic source as defined claim 1, wherein said electrodes are transparent.

5. A tunable optical device for controlling the propagation of light, said optical device comprising:
    a liquid crystal layer; and
    an electromagnetic source adjacent said liquid crystal layer, said electromagnetic source operative to generate a spatially non-uniform magnetic field acting on said liquid crystal layer, said magnetic field being dynamically variable on a basis of electrical current applied to said electromagnetic source, such that optical properties of said device are controllable.

6. A device as defined in claim 5, wherein said electromagnetic source includes:
    a substrate;
    an electrode structure coupled to said substrate, said electrode structure including interspaced electrodes, at least one of which is spiral-shaped; and
    at least one electrical contact interconnecting the electrodes of said electrode structure, whereby said electrode structure is responsive to the applied electrical current to generate said spatially non-uniform magnetic field.

7. A device as defined in claim 6, wherein said electromagnetic source is optically transparent.

8. A device as defined in claim 7, wherein said electrodes are transparent.

9. A device as defined in claim 6, wherein said electrodes are source electrodes, said device further comprising at least one device electrode for generating an electric field acting on said liquid crystal layer.

10. A device as defined in claim 9, wherein said at least one device electrode is responsive to a voltage applied between itself and at least one of said source electrodes to generate said electric field.

11. A device as defined in claim 10, wherein said device is a gradient index lens.

12. A device as defined in claim 9, wherein said device is a gradient index lens.

13. A device as defined in claim 6, wherein said device is a gradient index lens.

14. A device as defined in claim 5, wherein said device is a gradient index lens.

15. A variable liquid crystal optical device for controlling the propagation of light, said optical device having its propagation of light controlled by modulation of a spatially non-uniform magnetic field.

* * * * *